United States Patent
Ito et al.

(10) Patent No.: US 10,434,989 B2
(45) Date of Patent: Oct. 8, 2019

(54) VEHICLE WIPER DEVICE

(71) Applicant: DENSO CORPORATION, Kariya-shi, Aichi (JP)

(72) Inventors: Yasuhide Ito, Toyokawa (JP); Yoshihisa Banno, Nishio (JP); Akihiro Utsumi, Kosai (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/099,688

(22) PCT Filed: May 9, 2017

(86) PCT No.: PCT/JP2017/017551
§ 371 (c)(1),
(2) Date: Nov. 7, 2018

(87) PCT Pub. No.: WO2017/195779
PCT Pub. Date: Nov. 16, 2017

(65) Prior Publication Data
US 2019/0184941 A1     Jun. 20, 2019

(30) Foreign Application Priority Data

May 11, 2016 (JP) .................... 2016-095501
May 11, 2016 (JP) .................... 2016-095502

(51) Int. Cl.
*B60S 1/08*     (2006.01)
*B60S 1/18*     (2006.01)
(Continued)

(52) U.S. Cl.
CPC ............... *B60S 1/0807* (2013.01); *B60S 1/18* (2013.01); *B60S 1/3418* (2013.01); *B60S 1/46* (2013.01)

(58) Field of Classification Search
CPC .......... B60S 1/482; B60S 1/0807; B60S 1/46; B60S 1/3418; B25J 9/16; F04D 15/00; H02K 7/14; H02P 1/00; H02P 1/04; H02P 6/00; H02P 6/14; H02P 7/00; H02P 1/46; H02P 3/18; H02P 23/00; H02P 5/00; H02P 25/00; H02P 27/00; H02P 3/20
(Continued)

(56) References Cited

U.S. PATENT DOCUMENTS 4,707,641 A * 11/1987 Guerard .................... B60S 1/08
                                               318/443
5,819,360 A * 10/1998 Fujii ...................... B60S 1/482
                                               15/250.04
(Continued)

FOREIGN PATENT DOCUMENTS

JP     S52-105227 U     8/1977
JP     S62-113637 A     5/1987
(Continued)

*Primary Examiner* — Antony M Paul
(74) *Attorney, Agent, or Firm* — Solaris Intellectual Property Group, PLLC

(57) ABSTRACT

When an operation signal of a view-obstructing material removal mode switch has been detected, a controller controls such that wiping operation is performed while spraying washer fluid toward the opposite side to a movement direction side of a wiper blade, after which a wiping operation in which washer fluid is not sprayed is performed.

7 Claims, 14 Drawing Sheets

(51) Int. Cl.
*B60S 1/46* (2006.01)
*B60S 1/34* (2006.01)

(58) Field of Classification Search
USPC .......... 318/400.01, 700, 701, 727, 799, 266, 318/280, 466; 15/97.1, 250.02
See application file for complete search history.

(56) References Cited

U.S. PATENT DOCUMENTS

| | | | |
|---|---|---|---|
| 8,001,649 B2 * | 8/2011 | Rhodes | B60S 1/3415 15/250.02 |
| 9,067,567 B2 * | 6/2015 | Matsumoto | B60S 1/3801 |
| 9,463,777 B2 * | 10/2016 | Umeno | B60S 1/486 |
| 2013/0152320 A1 | 6/2013 | Matsumoto | |

FOREIGN PATENT DOCUMENTS

| | | |
|---|---|---|
| JP | 2012-224231 A | 11/2012 |
| JP | 2014-501199 A | 1/2014 |
| JP | 2015-217842 A | 12/2015 |

* cited by examiner

FIG.6
(A) WIPING OPERATION
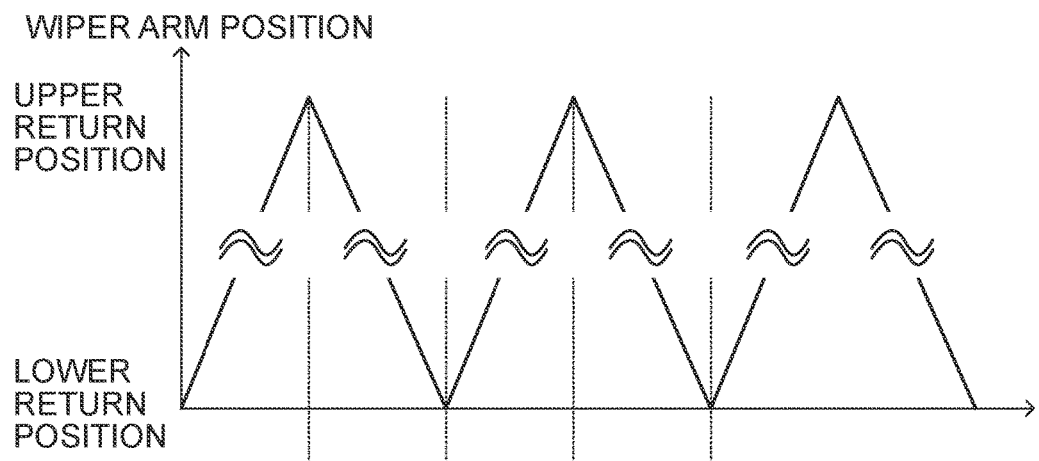
(B) SECOND WASHER PUMP
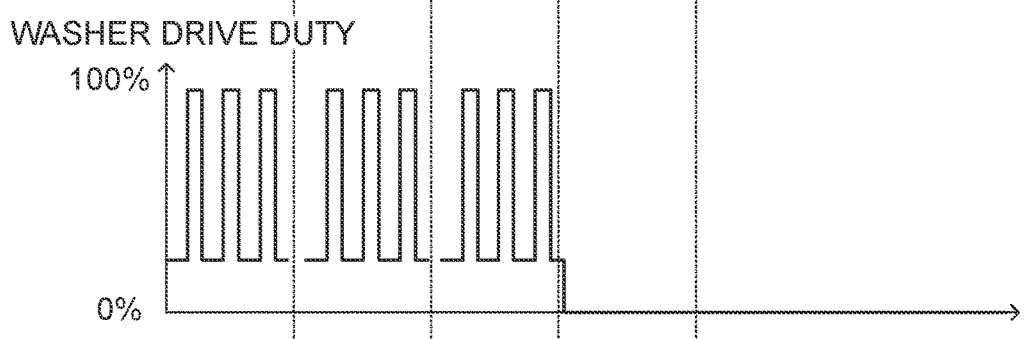
(C) FIRST WASHER PUMP
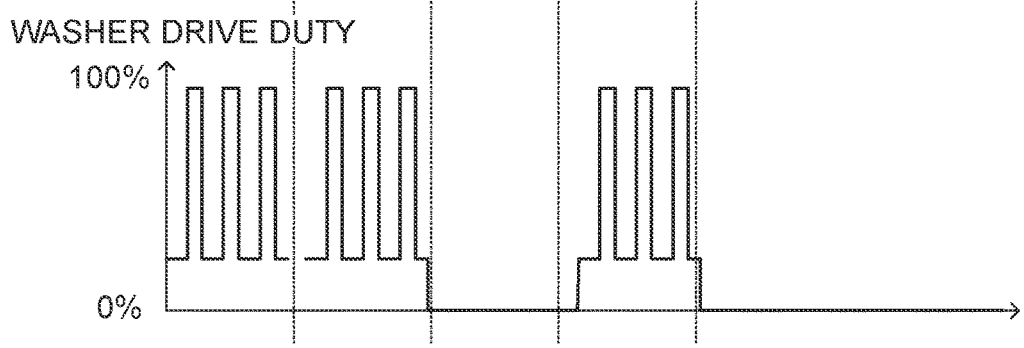

FIG.8
(A) WIPING OPERATION
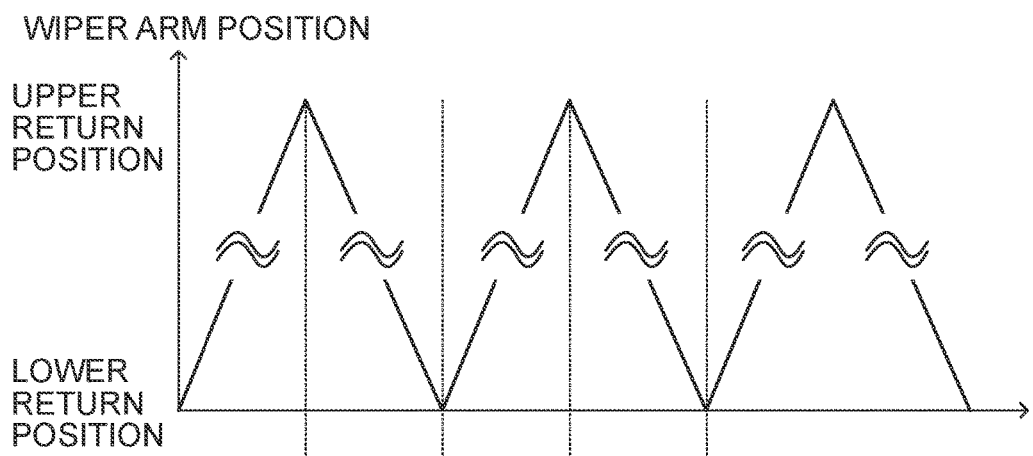
(B) SECOND WASHER PUMP
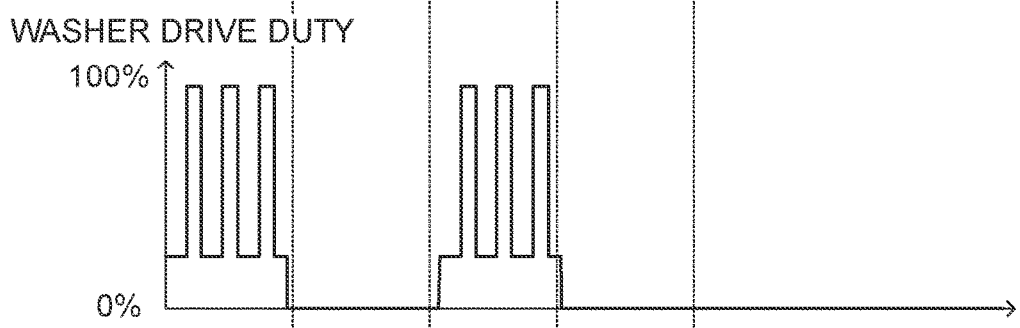
(C) FIRST WASHER PUMP
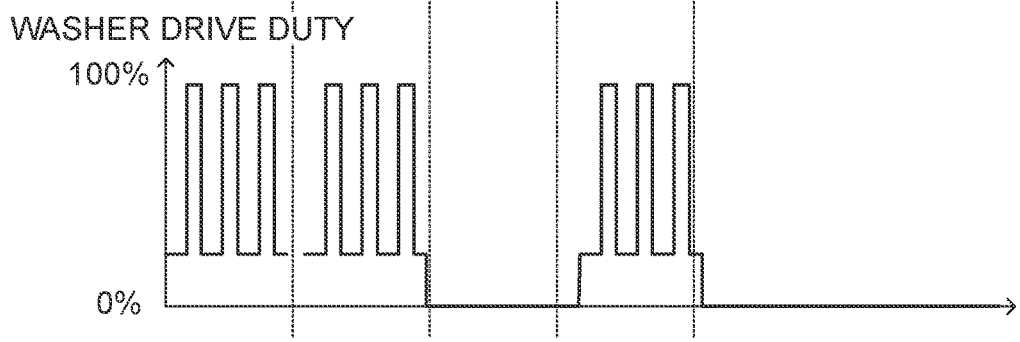

FIG.14
(A) WIPING OPERATION
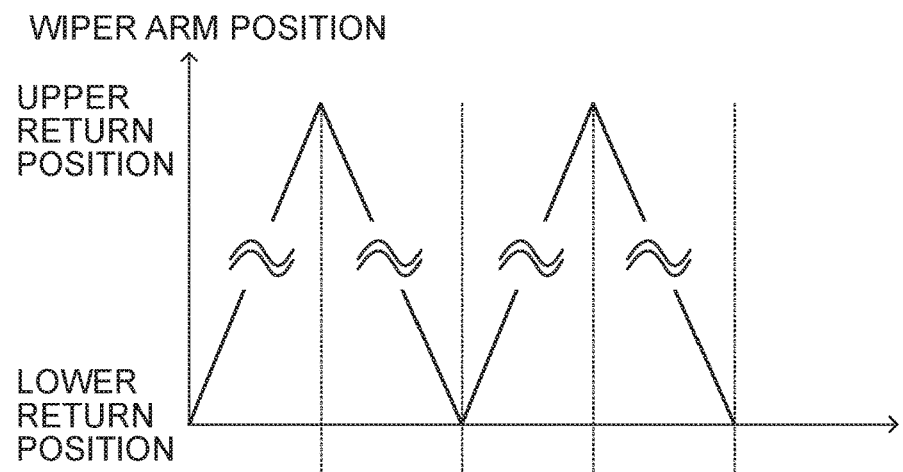
(B) SECOND WASHER PUMP
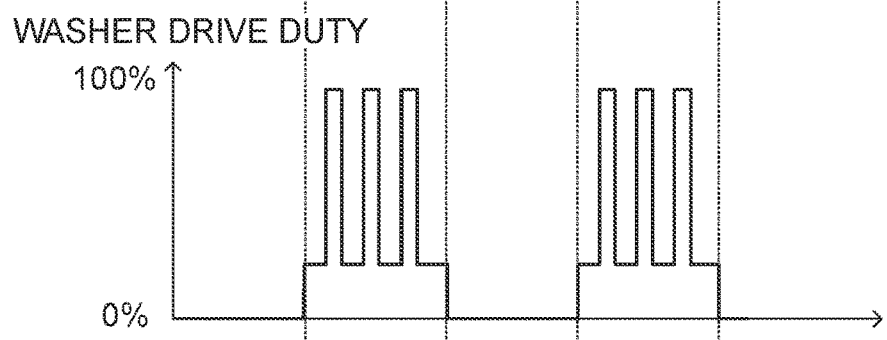
(C) FIRST WASHER PUMP
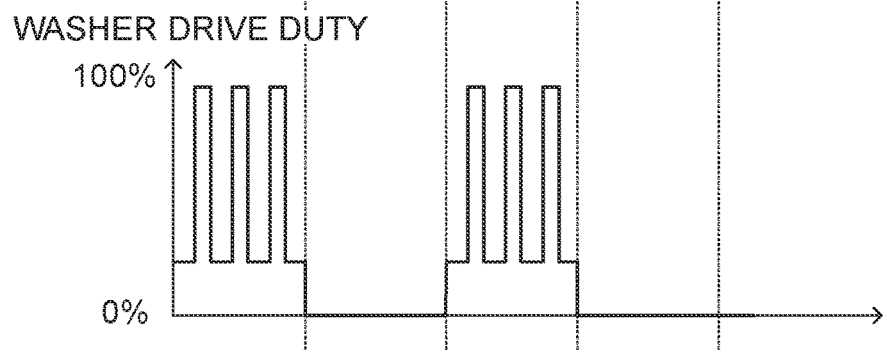

VEHICLE WIPER DEVICE

TECHNICAL FIELD

The present disclosure relates to a vehicle wiper device that sprays washer fluid and that performs a wiping operation with a wiper blade.

BACKGROUND ART

Vehicle wiper devices that coordinate spraying of washer fluid with a wiping operation of a wiper blade are widely known.

In recent years, nozzles for spraying washer fluid are being provided to wiper arms or wiper blades for reasons relating to the spraying position of washer fluid, reasons relating to vehicle design aesthetics, and so on. See, for example, Japanese Patent Application Laid-Open (JP-A) No. 2015-217842 and Japanese National-Phase Publication 2014-501199.

In the vehicle wiper device disclosed in JP-A No. 2015-217842, a main nozzle is provided at a leading end portion of a wiper arm, and a nozzle body portion of the main nozzle projects toward one width direction side of the wiper arm. A sloped face configuring an outer peripheral portion of the nozzle body portion is disposed at an arm base end side of a first main nozzle spray hole of the nozzle body portion, and slopes toward the arm lower side on progression toward the arm base end side in side view. Thus, most of an airflow flowing alongside the wiper arm from the arm base end side to the arm leading end side is guided by the sloped face so as to flow along the sloped face toward the upper side of the nozzle body portion. The airflow is thereby suppressed from flowing between windshield glass and the nozzle body portion, enabling cleaning fluid sprayed from the first main nozzle spray hole to be suppressed from coming into contact with the airflow.

Japanese National Phase-Publication 2014-501199 discloses a configuration in which cleaning fluid is sprayed through multiple holes provided in a wiper blade.

SUMMARY OF INVENTION

Technical Problem

However, in JP-A No. 2015-217842 and Japanese National Phase-Publication 2014-501199, although washer fluid can be sprayed from the wiper arm or the wiper blade, the washer fluid is wiped away before having a chance to act effectively on a view-obstructing material such as dirt. There is therefore room for improvement in efficiently removing view-obstructing material such as dirt.

The present disclosure provides a vehicle wiper device capable of efficiently removing view-obstructing material such as dirt.

Solution to Problem

A first aspect of the present disclosure is a vehicle wiper device including a wiper motor, a washer pump, a direction controller, and a control unit. The wiper motor causes a wiping operation to be performed on a wiping surface using a wiper blade coupled to a leading end of a wiper arm. The washer pump conveys washer fluid under pressure to a spray portion provided to at least one out of the wiper blade or the wiper arm so as to cause washer fluid to be sprayed from the spray portion toward the wiping surface. The direction controller controls a direction in which the spray portion sprays the washer fluid. In cases in which a predetermined signal has been detected, the control unit controls the wiper motor, the washer pump, and the direction controller such that a first operation is executed to perform the wiping operation while spraying washer fluid toward an opposite direction side of the wiper blade to a movement direction side of the wiper blade performing the wiping operation.

In the first aspect, the wiping operation on the wiping surface using the wiper blade coupled to the leading end of the wiper arm is performed by the wiper motor.

The spray portion is provided to at least one out of the wiper blade or the wiper arm, and washer fluid is conveyed to the spray portion under pressure by the washer pump such that the washer fluid is sprayed from the spray portion toward the wiping surface. The direction controller controls the direction (an outward direction or a return direction) in which the washer fluid is sprayed from the spray portion.

In cases in which a predetermined signal has been detected, such as a signal indicating that a view-obstructing material has been detected, or a signal indicating that a switch for removal of a view-obstructing material has been operated, the control unit controls the wiper motor, the washer pump, and the direction controller such that the first operation is executed. In the first operation, the wiping operation is performed while spraying washer fluid toward the opposite direction side of the wiper blade to the movement direction side of the wiper blade performing the wiping operation. By performing the wiping operation while spraying washer fluid toward the opposite side to the movement direction of the wiper blade, the washer fluid is not immediately wiped away, thus enabling the washer fluid to act effectively to remove the view-obstructing material, for example dirt.

A second aspect of the present disclosure is the vehicle wiper device of the first aspect, wherein after the first operation, the control unit controls the wiper motor, the washer pump, and the direction controller such that a second operation is executed to perform the wiping operation without spraying washer fluid, or to perform the wiping operation while spraying washer fluid toward the movement direction side.

In the second aspect, after the first operation, the view-obstructing material such as dirt can be reliably removed by performing the wiping operation, or by performing the wiping operation while spraying while spraying washer fluid. This thereby enables a vehicle wiper device to be provided that is capable of efficiently removing view-obstructing material such as dirt.

A third aspect of the present disclosure is the vehicle wiper device of the first aspect or the second aspect, further including a meander-forming section that causes washer fluid to form a meandering spray trajectory when washer fluid is being sprayed from the spray portion.

In the third aspect, the washer fluid forms a meandering spray trajectory, enabling the washer fluid to be sprayed evenly over the wiping surface.

A fourth aspect of the present disclosure is the vehicle wiper device of the third aspect, wherein the spray portion is capable of spraying washer fluid in a direction on the movement direction side that intersects the movement direction of the wiper blade, and in a direction on the opposite direction side that intersects the opposite direction to the movement direction of the wiper blade. Moreover, the meander-forming section controls the washer pump so as to vary a spray pressure of washer fluid when washer fluid is being sprayed from the spray portion.

In the fourth aspect, the washer fluid can be sprayed in a direction that intersects the movement direction of the wiper blade, and in a direction that intersects the opposite direction to the movement direction. Varying the spray pressure of the washer fluid enables the washer fluid to form a meandering spray trajectory.

A fifth aspect of the present disclosure is the vehicle wiper device of the third aspect, wherein the spray portion is capable of changing an angle at which washer fluid is sprayed on both the movement direction side and the opposite direction side. Moreover, the meander-forming section controls the spray portion so as to change the angle at which the spray portion sprays washer fluid on the movement direction side and the opposite direction side when washer fluid is being sprayed from the spray portion.

In the fifth aspect, the angle at which washer fluid is sprayed on both the movement direction side and the opposite direction side of the wiper blade can be changed. Changing the spray angle enables the washer fluid to form a meandering spray trajectory.

A sixth aspect of the present disclosure is the vehicle wiper device of the first aspect to the fifth aspect, wherein as the first operation, the control unit controls the wiper motor, the washer pump, and the direction controller so as to perform the wiping operation while washer fluid is also being sprayed toward the movement direction side.

In the sixth aspect, in the first operation, the wiping operation is performed while washer fluid is also being sprayed toward the movement direction side of the wiper blade. This thereby enables view-obstructing material such as dirt to be removed even more efficiently.

A seventh aspect of the present disclosure is the first aspect to the sixth aspect, further including a range-changing section that changes a wiping range of the wiper blade on the wiping surface. Moreover, the control unit further controls the range-changing section so as to perform the wiping operation while the wiping range is being changed.

In the seventh aspect, the wiping operation is performed while the wiping range is being changed, enabling view-obstructing material such as dirt to be removed over a wider range than in cases in which the wiping operation is performed without changing the wiping range.

BRIEF DESCRIPTION OF DRAWINGS

FIG. 6A is a diagram illustrating positions of a wiper arm during a to-and-fro wiping operation of the wiper arm, FIG. 6B is a diagram illustrating an example of a drive voltage of a second washer pump, and FIG. 6C is a diagram illustrating an example of a drive voltage of a first washer pump.

FIG. 8A is a diagram illustrating positions of a wiper arm during a to-and-fro wiping operation of the wiper arm, FIG. 8B is a diagram illustrating a first modified example of a drive voltage of a second washer pump, and FIG. 8C is a diagram illustrating a first modified example of a drive voltage of a first washer pump.

FIG. 14A is a diagram illustrating positions of a wiper arm during a to-and-fro wiping operation of the wiper arm, FIG. 14B is a diagram illustrating a second modified example of a drive voltage of a second washer pump, and FIG. 14C is a diagram illustrating a second modified example of a drive voltage of a first washer pump.

DESCRIPTION OF EMBODIMENTS

Figure 1:
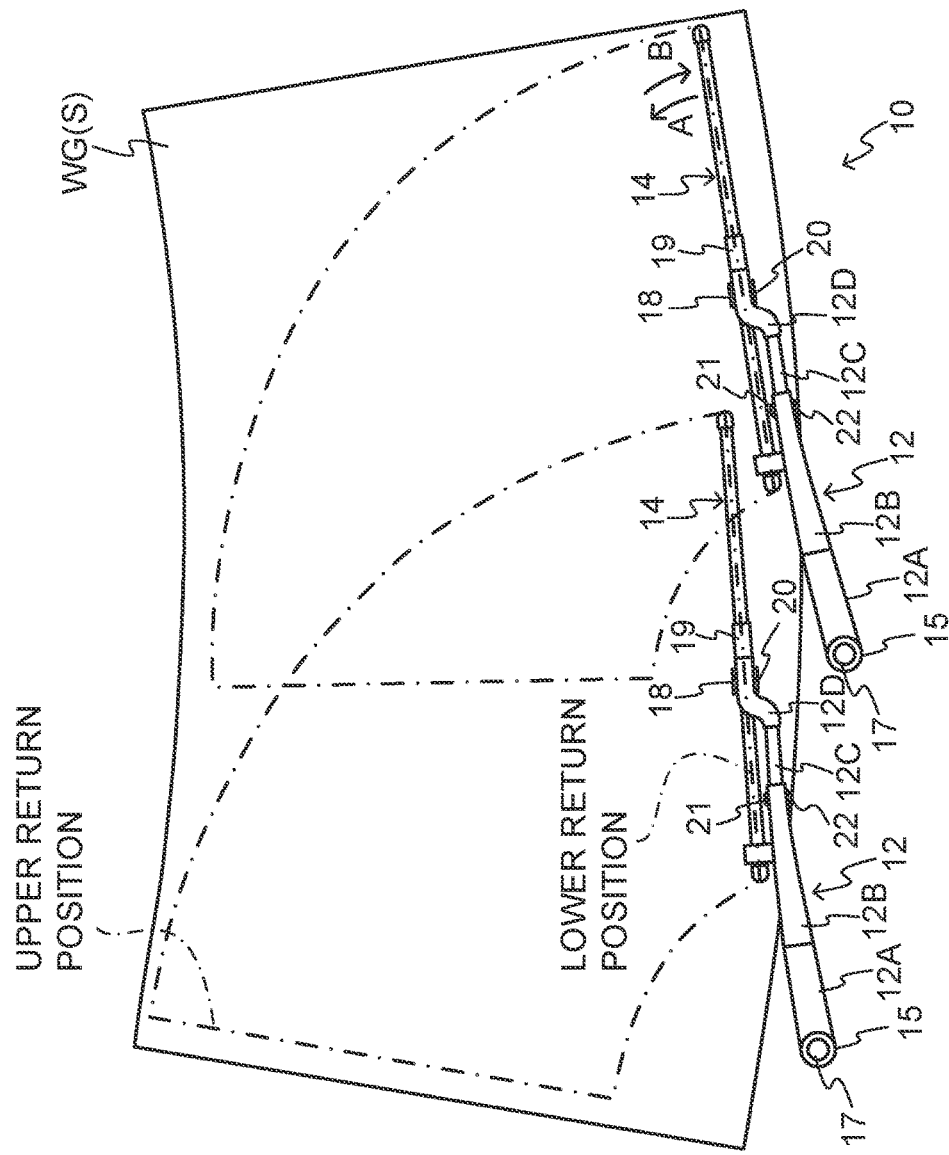
FIG. 1 is a plan view viewed from the outside of a wiping surface, illustrating an entire vehicle wiper device according to an exemplary embodiment of the present disclosure.

Detailed explanation follows regarding an example of an exemplary embodiment of the present disclosure, with reference to the drawings. FIG. 1 is a plan view viewed from the outside of a wiping surface, illustrating an entire vehicle wiper device according to the present exemplary embodiment.

As illustrated in FIG. 1, a vehicle wiper device 10 is configured including a pair of substantially elongated shaped wiper arms 12, and wiper blades 14 that are coupled to leading ends of the respective wiper arms 12 and wipe a windshield glass WG, serving as a wiping surface of a vehicle. The vehicle wiper device 10 also includes first main nozzles 18 and second main nozzles 20, respectively provided in the vicinity of leading end portions of the wiper arms 12, and first sub nozzles 21 and second sub nozzles 22, serving as spraying portions, provided in the vicinity of intermediate portions of the wiper arms 12.

Each wiper arm 12 is configured including an arm head 12A, a retainer 12B, an arm piece 12C, and an arm-side coupling member 12D. The arm head 12A configures a base end portion of the wiper arm 12, the retainer 12B configures a length direction intermediate portion of the wiper arm 12, and the arm piece 12C and the arm-side coupling member 12D configure the leading end portion of the wiper arm 12.

The arm head 12A is formed in a substantially rectangular column shape, and is, for example, made of die-cast aluminum. A fixing portion 15 is formed at a base end portion of the arm head 12A. A leading end portion of a substantially circular column shaped pivot shaft 17 is fastened and fixed to the fixing portion 15. The pivot shaft 17 is supported so as to be capable of swinging by a pivot holder (not illustrated in the drawings) fixed to a frame of the vehicle or the like, and is coupled to a wiper motor (not illustrated in the drawings) through a link mechanism. The pivot shafts 17 are swung to-and-fro by drive force from the wiper motor, such that the respective wiper arms 12 are swung to-and-fro and the wiper blades 14 coupled to the leading ends of the wiper arms 12 are swung to-and-fro between a lower return position and an upper return position to wipe the windshield glass WG In the present exemplary embodiment, a position where the wiper blades 14 are hidden by an engine hood of the vehicle further toward the arrow B direction side in FIG. 1 (vehicle lower side) than the lower return position configures a stowed position. The wiper blades 14 are stowed in the stowed position when a wiping operation has stopped. Thus, the wiper motor is configured so as to swing the wiper blades 14 to-and-fro by reversing the rotation direction at the upper return position and the lower return position, rather than continuously rotating in one direction. An electric motor including a control circuit that controls the revolution speed by pulse width modulation (PWM) control or the like is employed as the wiper motor. Note that the arrow A direction from the lower return position toward the upper return position in FIG. 1 is an outward swing direction of the wiper blades 14, and the arrow B direction from the upper return position toward the lower return position in FIG. 1 is a return swing direction of the wiper blades 14. Namely, the positions where the wiper blades 14 return from the outward path to the return path configure the upper return positions, and the positions where the wiper blades 14 return from the return path to the outward path are the lower return positions. In the present exemplary embodiment, since the wiper blades 14 are stowed in the stowed position as described above, explanation is given regarding an example of a configuration in which the wiper motor is driven for forward rotation and reverse rotation; however, a configuration may be applied in which the wiper motor rotates in one direction with the stowed position (stationary position) configuring the lower return position.

Each wiper blade 14 is formed in a substantially elongated shape, and is disposed alongside the respective wiper arm 12 in its length direction. A length direction center portion of the wiper blade 14 is coupled to a leading end portion of the arm-side coupling member 12D of the corresponding wiper arm 12 through a coupling lever 19. Thus, as viewed along a direction orthogonal to a wiping surface S, each wiper blade 14 is disposed on an outward swing direction side with respect to the corresponding wiper arm 12 (portions of the wiper arm 12 excluding the arm-side coupling member 12D). Each wiper blade 14 performs a to-and-fro wiping operation due to the corresponding wiper arm 12 swinging to-and-fro.

Washer fluid is sprayed from the first main nozzles 18, the second main nozzles 20, the first sub nozzles 21, and the second sub nozzles 22 provided to the wiper arms 12.

The first main nozzles 18 and the first sub nozzles 21 spray washer fluid toward the outward swing direction side of the respective wiper arms 12, and the second main nozzles 20 and the second sub nozzles 22 spray washer fluid toward the return swing direction side of the respective wiper arms 12.

Figure 2:
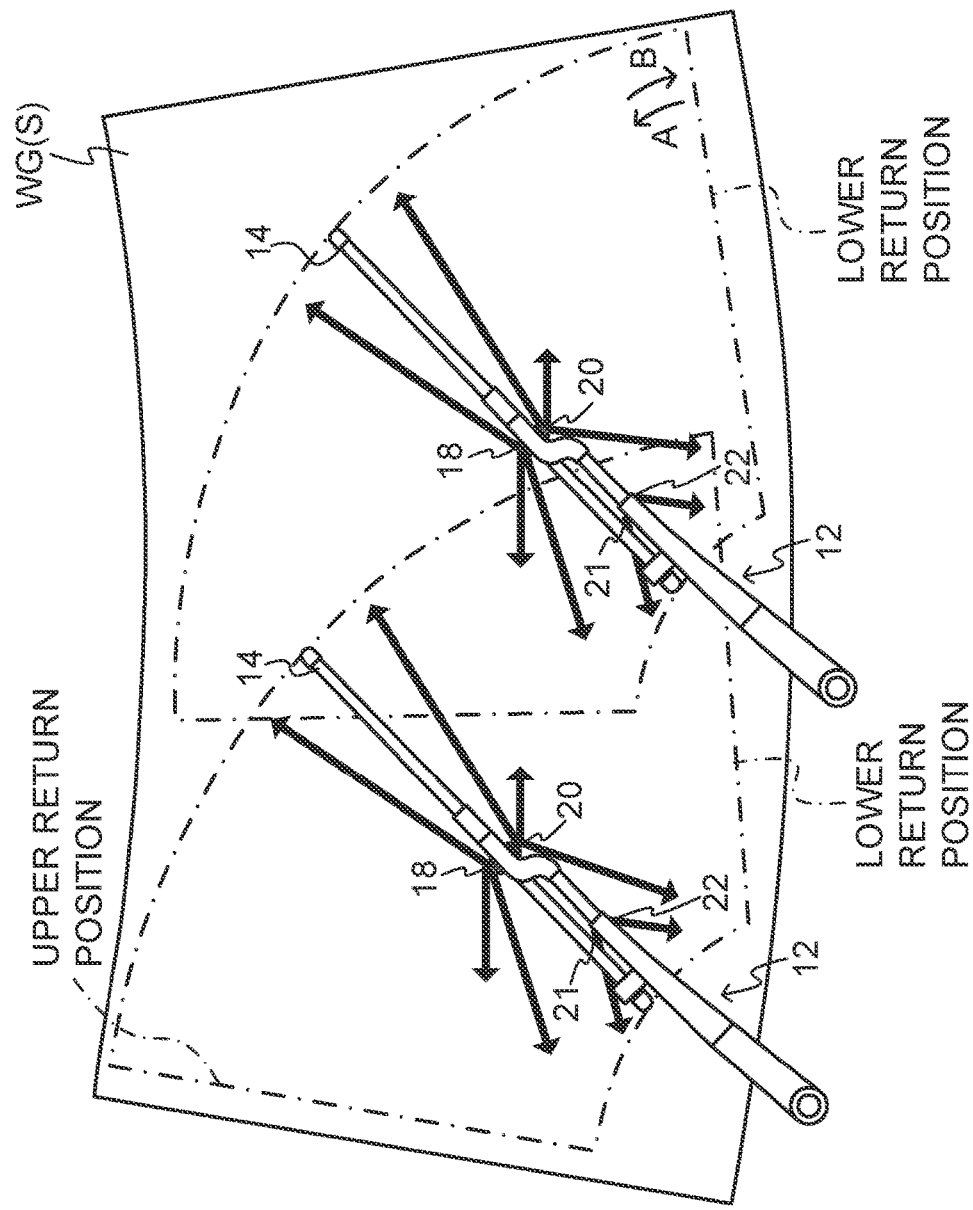
FIG. 2 is a diagram illustrating spray directions of washer fluid.

The first main nozzles 18 and the second main nozzles 20 each include plural spray holes, and washer fluid is sprayed through these plural spray holes. In the present exemplary embodiment, the first main nozzles 18 and the second main nozzles 20 each include three spray holes. As illustrated in FIG. 2, washer fluid is sprayed through these spray holes in directions intersecting the swing directions of the wiper arms 12.

The first sub nozzles 21 and the second sub nozzles 22 are provided further toward the respective pivot shafts 17 than the first main nozzles 18 and the second main nozzles 20. Washer fluid is sprayed through spray holes provided in the first sub nozzles 21 and the second sub nozzles 22 in directions intersecting the swing directions of the respective wiper arms 12.

In the present exemplary embodiment, when a washer switch 36 (see FIG. 3), described later, is operated in order to spray washer fluid, washer fluid is sprayed from the first main nozzles 18 and the first sub nozzles 21 toward the outward swing side of the wiper blades 14 while the wiper arms 12 swing along an outward path. Washer fluid is sprayed from the second main nozzles 20 and the second sub nozzles 22 toward the return swing side of the wiper blades 14 while the wiper arms 12 swing along a return path. The spraying of washer fluid is stopped at respective predetermined positions just before reaching the upper return position when swinging in the outward swing direction, and just before reaching the lower return position when swinging in the return swing direction. Wasteful spraying of washer fluid is prevented by switching between the spraying nozzles (between the first main nozzles 18 and the second main nozzles 20, and the first sub nozzles 21 and the second sub nozzles 22) and then resuming the spraying of washer fluid at the respective return positions.

Figure 3:
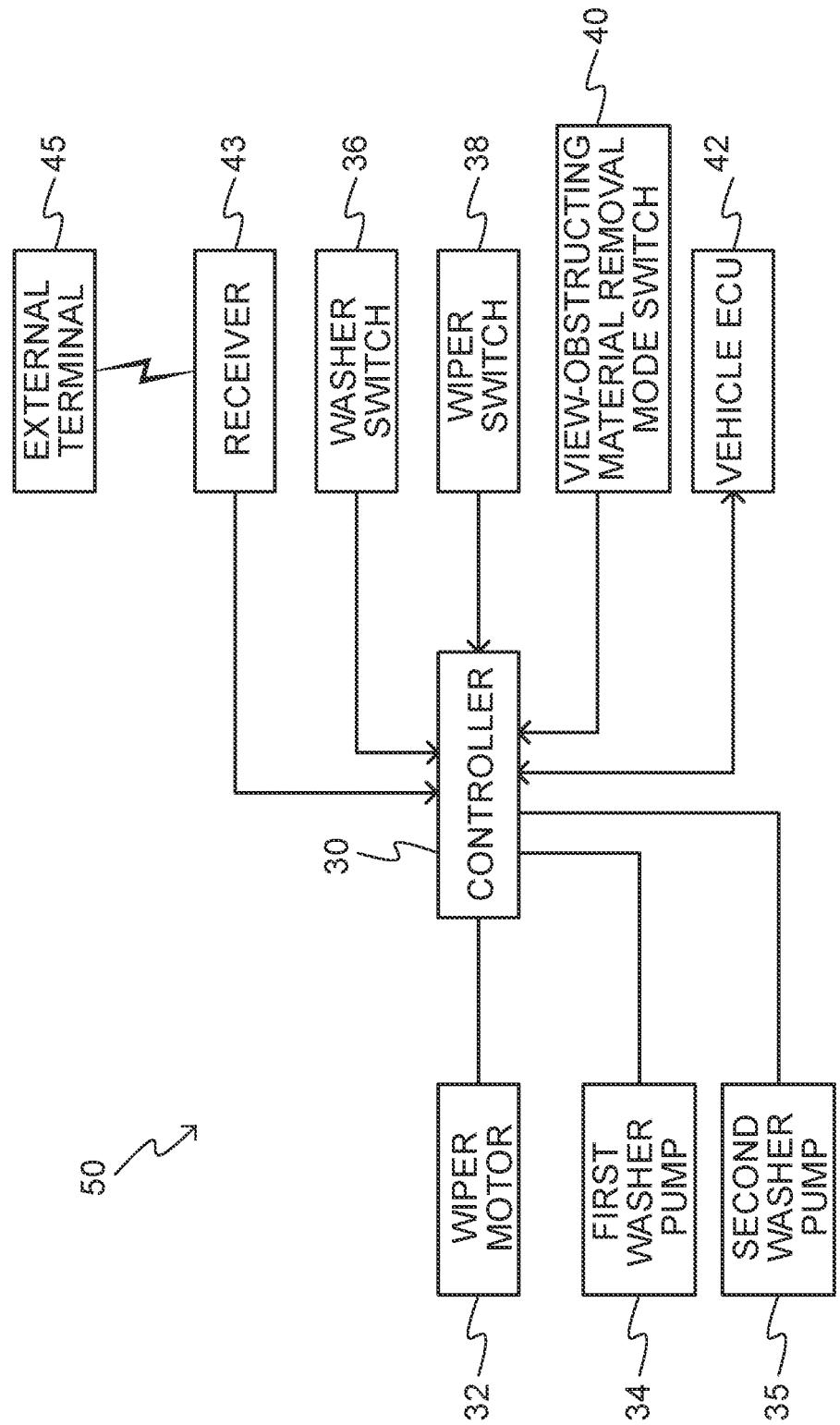
FIG. 3 is a block diagram illustrating a configuration of a control device for controlling a vehicle wiper device according to an exemplary embodiment of the present disclosure.

FIG. 3 is a block diagram illustrating configuration of a control device 50 that controls the vehicle wiper device 10 according to the present exemplary embodiment.

The control device 50 includes a wiper motor 32, a first washer pump 34, a second washer pump 35, and a controller 30 serving as a control unit.

The wiper motor 32 is driven in order to swing the wiper arms 12 to-and-fro. The first washer pump 34 conveys washer fluid under pressure to the first main nozzles 18 and the first sub nozzles 21, such that washer fluid is sprayed through each of the spray holes provided in the respective first main nozzles 18 and through each of the first sub nozzles 21. The second washer pump 35 conveys washer fluid under pressure to the second main nozzles 20 and the second sub nozzles 22, such that washer fluid is sprayed through each of the spray holes provided in the respective second main nozzles 20 and through each of the second sub nozzles 22. The wiper motor 32, the first washer pump 34, and the second washer pump 35 are each connected to the controller 30 and are driven under the control of the controller 30.

The washer switch 36, a wiper switch 38, a view-obstructing material removal mode switch 40, a vehicle electronic control unit (ECU) 42, and a receiver 43, all of which are provided to the vehicle, are also connected to the controller 30.

The washer switch 36 is a switch for instructing spraying of washer fluid. An operation outcome is input to the controller 30 when the washer switch 36 has been operated by an occupant.

In the present exemplary embodiment, when the washer switch 36 has been operated by the occupant in order to instruct spraying of washer fluid, the operation outcome of the washer switch 36 is input to the controller 30. When the operation outcome of the washer switch 36 is input to the controller 30, the controller 30 drives the first washer pump 34 straight away to spray a specific amount of washer fluid, and then starts to drive the wiper motor 32, according to the operation outcome of the washer switch 36. Namely, when the washer switch 36 has been operated, the controller 30 controls the wiper motor 32 and the first washer pump 34 such that spraying of washer fluid is coordinated with a wiping operation by the wiper blades 14. Note that the second washer pump 35 is controlled when performing a wiping operation in the return swing direction.

The wiper switch 38 is a switch for instructing the start of a wiping operation by the wiper blades 14. An operation outcome is input to the controller 30 when the wiper switch 38 has been operated by the occupant. The wiper switch 38 is capable of instructing plural speeds for the speed of the wiping operation by the wiper blades 14. When the operation outcome of the wiper switch 38 is input to the controller 30, the controller 30 drives the wiper motor 32 at the instructed speed and starts the wiping operation by the wiper blades 14 according to the operation outcome of the wiper switch 38. Note that in the present exemplary embodiment, explanation is given regarding an example in which there are four wiping operation speeds of the wiper blades 14 when the wiper switch 38 has been operated, these being intermittent operation, low speed, medium speed, and high speed.

The view-obstructing material removal mode switch 40 is a switch for instructing a predetermined view-obstructing material removal operation to remove a view-obstructing material. Dirt stuck to the surface of the windshield glass WG is an example of the view-obstructing material. The view-obstructing material removal operation is performed by spraying washer fluid and performing a wiping operation by the wiper blades 14 in a predetermined combination. In the present exemplary embodiment, a dedicated switch is provided separately to the washer switch 36 and the wiper switch 38, such that view-obstructing material removal is instructed separately to instructions for a wiping operation by the wiper blades 14 and spraying of washer fluid. An operation outcome is input to the controller 30 when the view-obstructing material removal mode switch 40 has been operated by an occupant. The first washer pump 34, the second washer pump 35, and the wiper motor 32 are driven under the control of the controller 30 so as to perform the predetermined view-obstructing material removal operation according to the operation outcome of the view-obstructing material removal mode switch 40.

The vehicle ECU 42 is connected to the controller 30 in order to acquire various information regarding the vehicle. In the present exemplary embodiment, the controller 30 is capable of acquiring information for detecting that the vehicle is stationary from the vehicle ECU 42. For example, the controller 30 acquires a detection result for a shift position of a vehicle transmission, a detection result for vehicle speed, a detection result for acceleration, or the like as information from the vehicle ECU 42 for detecting that the vehicle is stationary. In the present exemplary embodiment, the controller 30 controls such that the above-described view-obstructing material removal operation is performed when the controller 30 has detected that the vehicle is in a stationary state.

The receiver 43 is a receiver for receiving the instruction to perform the predetermined view-obstructing material removal operation for removing a view-obstructing material. Dirt stuck to the surface of the windshield glass WG is an example of the view-obstructing material. The view-obstructing material removal operation is performed by spraying washer fluid and performing a wiping operation by the wiper blades 14 in a predetermined combination. When an occupant (or a person who intends to board the vehicle shortly) has transmitted an instruction to perform the view-obstructing material removal operation from an external terminal 45 such as a smartphone, this instruction is received by the receiver 43 and input to the controller 30. The first washer pump 34, the second washer pump 35, and the wiper motor 32 are driven under the control of the controller 30 so as to perform the predetermined view-obstructing material removal operation according to the instruction to perform the view-obstructing material removal operation.

Detailed explanation follows regarding the above-described view-obstructing material removal operation performed when the view-obstructing material removal mode switch 40 is operated.

In the present exemplary embodiment, as described above, the view-obstructing material removal operation that combines spraying of washer fluid and a wiping operation by the wiper blades 14 is performed when the view-obstructing material removal mode switch 40 has been operated and the vehicle is in the stationary state.

Specifically, when the view-obstructing material removal mode switch 40 has been operated, the controller 30 acquires various information (including the shift position of the transmission, the vehicle speed, and acceleration) from the vehicle ECU 42 to detect whether or not the vehicle is in the stationary state. When the controller 30 has detected that the vehicle is in the stationary state, the controller 30 controls the wiper motor 32, the first washer pump 34, and the second washer pump 35 so as to perform a predetermined operation combining a to-and-fro wiping operation by the wiper blades 14 and spraying of washer fluid.

More specifically, as illustrated in FIG. 2, as an initial operation washer fluid is sprayed toward both the outward swing direction side and the return swing direction side of the wiper arms 12 while the wiper blades 14 perform a single to-and-fro wiping operation. Namely, the wiper blades 14 perform a single to-and-fro wiping operation while spraying washer fluid in both the movement direction of the wiper blades and the opposite direction to the movement direction. Note that at the start of the initial operation, the timing to start spraying washer fluid on the outward direction side (from the first main nozzles 18 and the first sub nozzles 21) may be the same as the timing of the start of the wiping operation; however, starting to spray washer fluid prior to the start of the wiping operation enables a smoother wiping operation. On the return direction side (from the second main nozzles 20 and the second sub nozzles 22), starting to spray washer fluid just after the wiping operation has started, or after a specific duration has elapsed since the wiping operation has started, enables wasteful spraying of washer fluid outside the wiping range (onto a cowl or the like) to be prevented. Note that a first operation, described below, may be performed without implementing this initial operation.

Figure 4A:
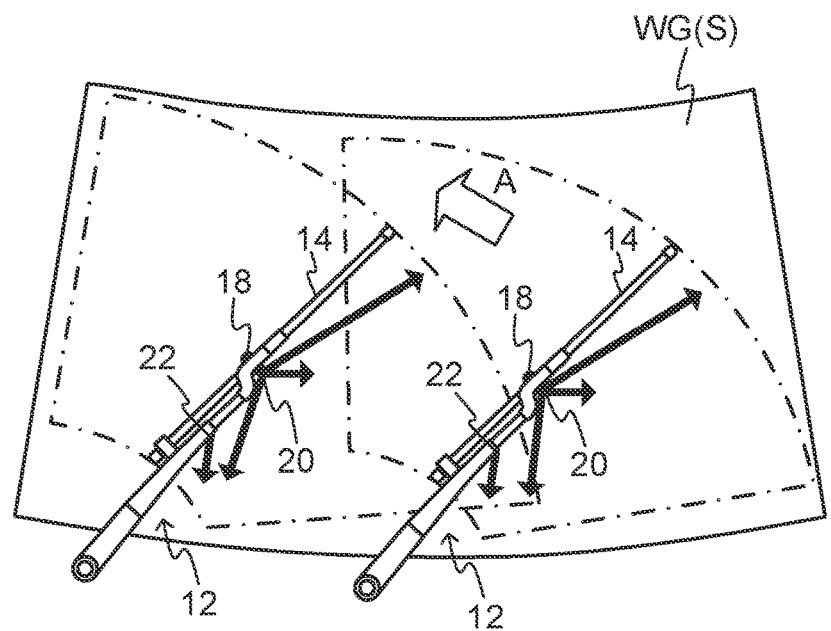
FIG. 4A is a diagram illustrating a wiping operation of wiper blades in an outward swing direction while washer fluid is being sprayed toward a return swing direction side.
Figure 4B:
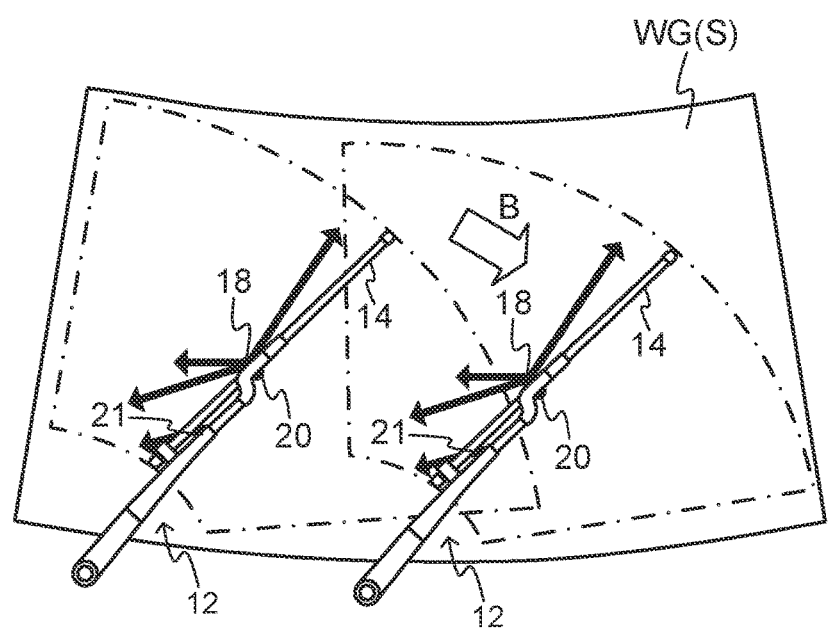
FIG. 4B is a diagram illustrating a wiping operation of wiper blades in the return swing direction while washer fluid is being sprayed toward the outward swing direction side.

When the initial operation in which the wiper blades 14 perform a single to-and-fro wiping operation has ended, as illustrated in FIG. 4A, as the first operation, the wiper blades 14 perform an outward swing direction wiping operation, during which washer fluid is sprayed toward the return swing direction side and spraying of washer fluid toward the outward swing direction side is halted. In other words, the wiper blades 14 perform an outward swing direction wiping operation during which washer fluid is sprayed through the second main nozzles 20 and the second sub nozzles 22, and spraying of washer fluid through the first main nozzles 18 and the first sub nozzles 21 is halted. When the wiper blades 14 have moved as far as the upper return position, the wiper blades 14 change direction, switching to a return swing direction wiping operation. As illustrated in FIG. 4B, in the return swing direction wiping operation, the wiper blades 14 perform a return swing direction wiping operation, during which washer fluid is sprayed toward the outward swing direction side and spraying of the washer fluid toward the return swing direction side is halted. In other words, the wiper blades 14 perform a return swing direction wiping operation during which washer fluid is sprayed through the first main nozzles 18 and the first sub nozzles 21 and spraying of washer fluid through the second main nozzles 20 and the second sub nozzles 22 is halted. Namely, as the first operation, the wiper blades 14 perform a single to-and-fro wiping operation during which washer fluid is sprayed toward the opposite side to the movement direction of the wiper blades 14. Note that when performing the wiping operations from the respective return positions in the first operation, starting to spray washer fluid just after the wiping operation has started, or after a specific duration has elapsed since the wiping operation has started, enables wasteful spraying of washer fluid outside the wiping range to be prevented.

Then, as a second operation after the first operation has ended, the wiper blades 14 perform a single to-and-fro wiping operation during which washer fluid is not sprayed, such that the windshield glass WG is given a finishing wipe to complete this operation routine.

Note that the controller 30 may control the wiper motor 32 such that the wiping speed of the wiper blades 14 when performing the view-obstructing material removal operation is a lower speed than the wiping speed of a wiping operation when the wiper switch 38 has been operated in wet weather. Employing a slower wiping speed than in wet weather enables view-obstructing material removal performance to be improved.

Figure 5A:
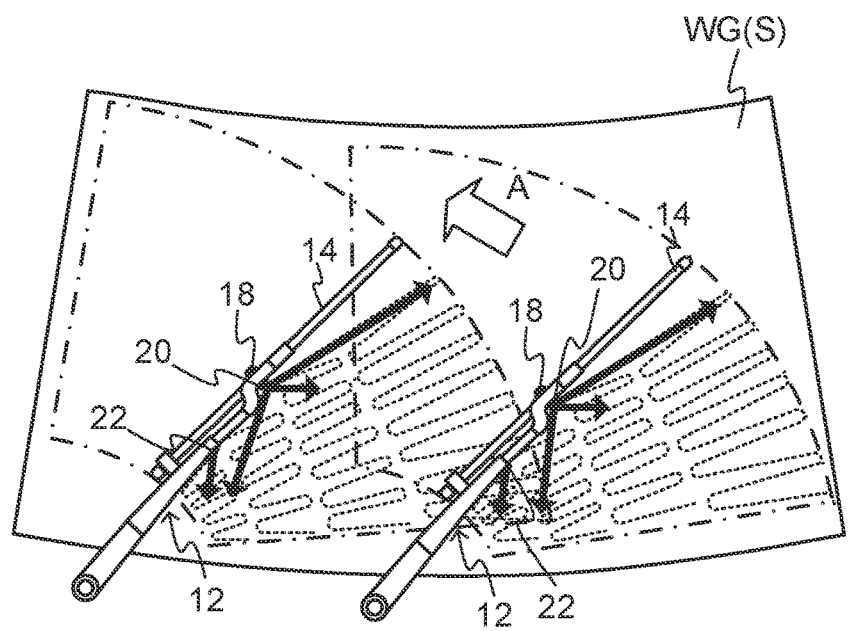
FIG. 5A is a diagram illustrating meandering spray trajectories of washer fluid.
Figure 5B:
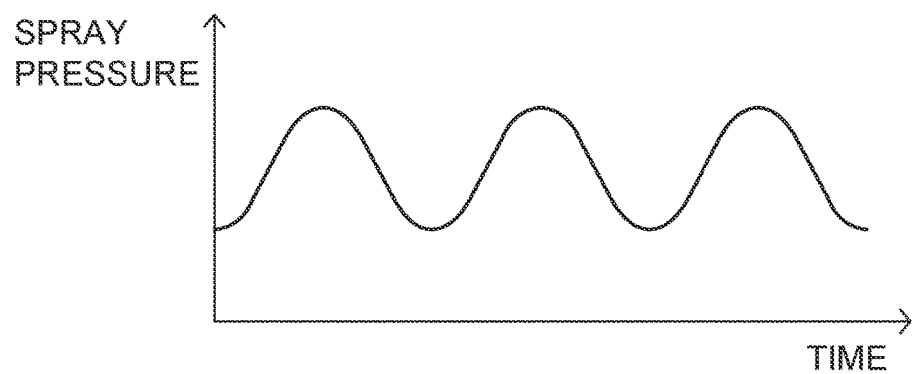
FIG. 5B is a diagram illustrating cyclical variations in the spray pressure of washer fluid.

In the present exemplary embodiment, washer fluid is sprayed in directions intersecting the swing directions of the wiper arms 12 (the movement direction of the wiper blades 14) while varying the spray pressure, thereby enabling washer fluid to be distributed evenly over the windshield glass WG For example, as illustrated in FIG. 5A, varying the spray pressure when spraying washer fluid toward the opposite side to the swing direction of the wiper arms 12 (the outward swing direction in FIG. 5A) while the wiper arms 12 perform a wiping operation creates meandering washer fluid spray trajectories (trajectories configured by connected washer fluid landing points). This enables washer fluid to be sprayed evenly over the entire surface of the windshield glass WG As this is performed, the spray pressure is varied cyclically, as illustrated in FIG. 5B, for example by controlling drive voltages. Specifically, when a single to-and-fro wiping operation is performed by the wiper arms 12 in the initial operation as illustrated in FIG. 6A, by cyclically varying the respective drive duties of the first washer pump 34 and the second washer pump 35 as illustrated in FIG. 6B and FIG. 6C, the washer fluid is sprayed with varying washer fluid pressure. Meandering spray trajectories of washer fluid are formed corresponding to the swinging of the wiper arms 12, enabling the windshield glass WG to be evenly sprayed. Next, in the to-and-fro wiping operation of the wiper arms 12 in the first operation, spraying of the washer fluid in the swing directions of the wiper arms 12 is stopped, and the drive duty of the washer pump that supplies washer fluid to the opposite side to the swing direction is cyclically varied. As illustrated in FIG. 5A, this enables washer fluid to be sprayed in a meandering pattern on the opposite side to the swing direction of each wiper arm 12. In the final to-and-fro wiping operation of the wiper arms 12 in the second operation, application of voltage to the washer pumps is stopped while the wiper blades 14 perform the wiping operation.

Figure 7:
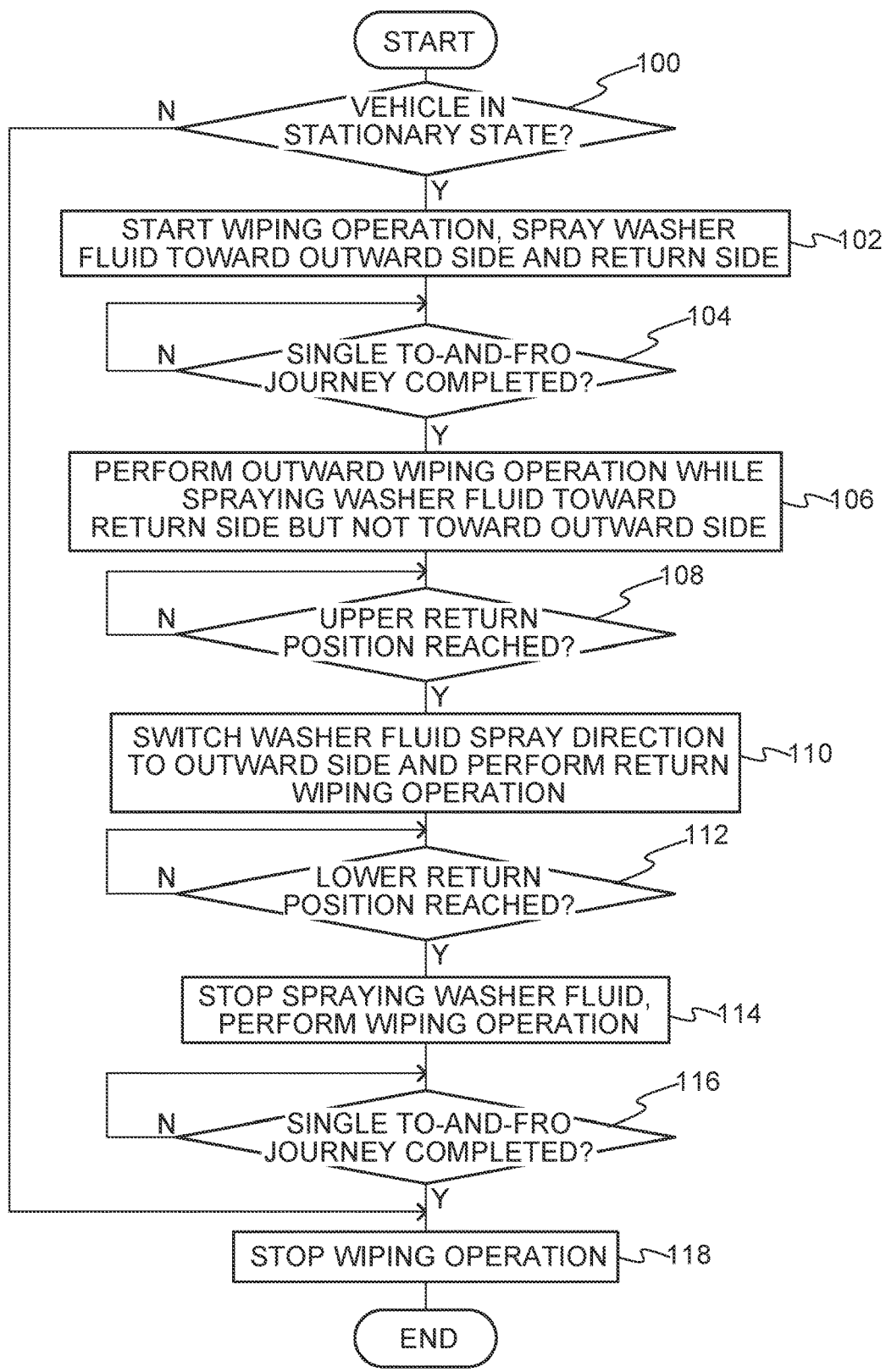
FIG. 7 is a flowchart illustrating an example of a flow of processing performed by a controller of a vehicle wiper device according to an exemplary embodiment of the present disclosure.

Next, explanation follows regarding specific processing performed by the controller 30 of the vehicle wiper device 10 according to the present exemplary embodiment, configured as described above. FIG. 7 is a flowchart illustrating an example of a flow of processing performed by the controller 30 of the vehicle wiper device 10 according to the present exemplary embodiment. Note that although the processing in FIG. 7 starts when the view-obstructing material removal mode switch 40 has been operated, there is no limitation thereto. For example, the processing may start when a view-obstructing material has been detected on the windshield glass WG based on an image captured by an imaging device such as a camera. Namely, the processing starts when a predetermined signal has been detected, the predetermined signal including at least one out a view-obstructing material removal mode switch 40 operation signal, a view-obstructing material detection signal, or a view-obstructing material removal operation instruction signal from the external terminal 45 that has been received by the external receiver 43.

At step 100, the controller 30 determines whether or not the vehicle is in the stationary state. To make this determination, the controller 30 acquires vehicle information such as a shift position detection result, a vehicle speed detection result, or an acceleration detection result from the vehicle ECU 42, and determines whether or not the vehicle is in the stationary state based on the acquired vehicle information. Processing is ended without the view-obstructing material removal operation being performed in cases in which determination is negative, and processing transitions to step 102 in cases in which determination in affirmative. Namely, in the present exemplary embodiment, the view-obstructing material removal operation is performed by executing the following processing when the vehicle is in the stationary state.

At step 102, the controller 30 controls so as to start a wiping operation by the wiper blades 14 and to spray washer fluid toward both the outward direction side and the return direction side, and then processing transitions to step 104. Namely, the controller 30 controls such that the wiper motor 32, the first washer pump 34, and the second washer pump 35 are driven. Thus, washer fluid is sprayed through the first main nozzles 18 and the first sub nozzles 21 using the first washer pump 34 and washer fluid is sprayed through the second main nozzles 20 and the second sub nozzles 22 using the second washer pump 35 while the wiping operation is being performed. While this is being performed, the washer fluid is sprayed with varying spray pressures by, for example, cyclically varying the duty ratios of the applied voltages when controlling the first washer pump 34 and the second washer pump 35. Specifically, the controller 30, serving as a meander-forming section, controls such that the voltages illustrated in FIG. 6C are applied to the first washer pump 34 and the voltages illustrated in FIG. 6B are applied to the second washer pump 35 while driving the wiper motor 32. The washer fluid is thereby sprayed in meandering spray trajectories, enabling the front surface of the windshield glass WG to be evenly sprayed, and enabling view-obstructing materials such as dirt to be efficiently removed.

At step 104, the controller 30 determines whether or not the wiper arms 12 have completed one to-and-fro journey. To make this determination, the controller 30 determines whether or not the initial operation has ended based on a detection result of a sensor or the like for detecting the position of a rotation shaft provided to the wiper motor 32.

The wiping operation and spraying of washer fluid is continued until determination is affirmative, after which processing transitions to step 106.

At step 106, the controller 30 controls such that an outward direction wiping operation is performed, during which spraying of washer fluid toward the outward direction side is stopped and washer fluid is sprayed toward the return direction side, before processing transitions to step 108. Namely, the controller 30 controls such that application of voltage to the first washer pump 34 is stopped as illustrated in FIG. 6C, and voltage is applied to the second washer pump 35 as illustrated in FIG. 6B, while the wiper motor 32 is being driven. Washer fluid is thereby sprayed on the opposite side to the movement direction of the wiper blades 14 during the outward wiping operation, enabling meandering spray trajectories to be formed.

At step 108, the controller 30 determines whether or not the wiper blades 14 coupled to the leading ends of the respective wiper arms 12 have swung as far as the upper return position. This determination is made based on a detection result of the sensor or the like for detecting the position of the rotation shaft provided to the wiper motor 32. The controller 30 stands by until determination is affirmative, then processing transitions to step 110.

At step 110, the controller 30 controls such that the washer fluid spray direction is switched to the outward direction side and a wiping operation toward the return direction side is performed, then processing transitions to step 112. Namely, the controller 30 controls such that application of voltage to the second washer pump 35 is stopped as illustrated in FIG. 6B, and voltage is applied to the first washer pump 34 as illustrated in FIG. 6C, while the wiper motor 32 is being driven. Washer fluid is thereby sprayed on the opposite side to the movement direction of the wiper blades 14 during the return wiping operation, enabling meandering spray trajectories to be formed.

At step 112, the controller 30 determines whether or not the wiper blades 14 coupled to the leading ends of the respective wiper arms 12 have swung as far as the lower return position. To make this determination, the controller 30 determines whether or not the first operation has ended based on a detection result of the sensor or the like for detecting the position of the rotation shaft provided to the wiper motor 32. The controller 30 stands by until determination is affirmative, then processing transitions to step 114. Spraying washer fluid toward the opposite side to the movement direction of the wiper arms 12 while the wiping operation is being performed by the wiper blades 14 in this manner enables washer fluid to act effectively to remove view-obstructing materials such as dirt.

At step 114, the controller 30 controls such that a wiping operation is performed, during which spraying of washer fluid is stopped, before processing transitions to step 116. Namely, the controller 30 controls such that application of voltage to the first washer pump 34 and the second washer pump 35 is stopped while the wiper motor 32 continues to be driven.

At step 116, the controller 30 determines whether or not the wiper arms 12 have completed one to-and-fro journey. To make this determination, the controller 30 determines whether or not the second operation has ended based on a detection result of the sensor or the like for detecting the position of the rotation shaft provided to the wiper motor 32. The wiping operation is continued without washer fluid being sprayed until determination is affirmative, after which processing transitions to step 118. Namely, performing a single to-and-fro wiping operation without washer fluid being sprayed enables the washer fluid that has been sprayed onto the windshield glass WG to be wiped off. Note that in the present exemplary embodiment, as the second operation, a washer fluid wipe-off operation is performed without washer fluid being sprayed; however, a wipe-off operation may be performed by performing a wiping operation while washer fluid is being sprayed toward the movement direction side of the wiper blades 14.

At step 118, the controller 30 controls the wiper motor 32 such that the wiping operation is stopped, and the view-obstructing material removal operation routine is ended.

Thus, in the present exemplary embodiment, washer fluid is sprayed in at least the opposite direction to the movement direction of the wiper blades 14 while a wiping operation is being performed. Accordingly, the sprayed washer fluid is not immediately wiped away, thus enabling the washer fluid to act effectively on the view-obstructing material. This enables performance in removing view-obstructing materials such as dirt to be improved.

Note that in the view-obstructing material removal operation of the above exemplary embodiment, spraying of washer fluid is controlled according to the swinging of the wiper arms 12 as illustrated in FIG. 6A to FIG. 6C; however, the view-obstructing material removal operation is not limited thereto. For example, a configuration may be adopted in which the first operation of the above exemplary embodiment is a similar operation to the initial operation. In such cases, the initial operation may be omitted, with only the first operation and the second operation being performed. Alternatively, a single to-and-fro wiping operation may be applied in which washer fluid is sprayed toward the return swing side during an outward swing direction wiping operation of the wiper blades 14, and washer fluid is sprayed toward the return swing side, or washer fluid is not sprayed at all, during a return swing direction wiping operation of the wiper blades 14. Alternatively, control may be performed as illustrated in FIG. 8A to FIG. 8C. Namely, in FIG. 8A to FIG. 8C, during an outward swing direction wiping operation of an initial operation, the first washer pump 34 and the second washer pump 35 are driven to spray washer fluid toward both the outward swing direction side and the return swing direction side of the wiper arms 12. During a return swing direction wiping operation of the initial operation, only the first washer pump 34 is driven, such that the wiping operation is performed while washer fluid is sprayed toward the opposite side to the movement direction of the wiper blades 14. Subsequent control is similar to that of the above exemplary embodiment.

In the above exemplary embodiment, the initial operation, the first operation, and the second operation are each configured by a single to-and-fro wiping operation; however, there is no limitation to a single to-and-fro wiping operation, and for example, the initial operation, the first operation, and the second operation may each be configured by plural to-and-fro wiping operations.

Figure 9:
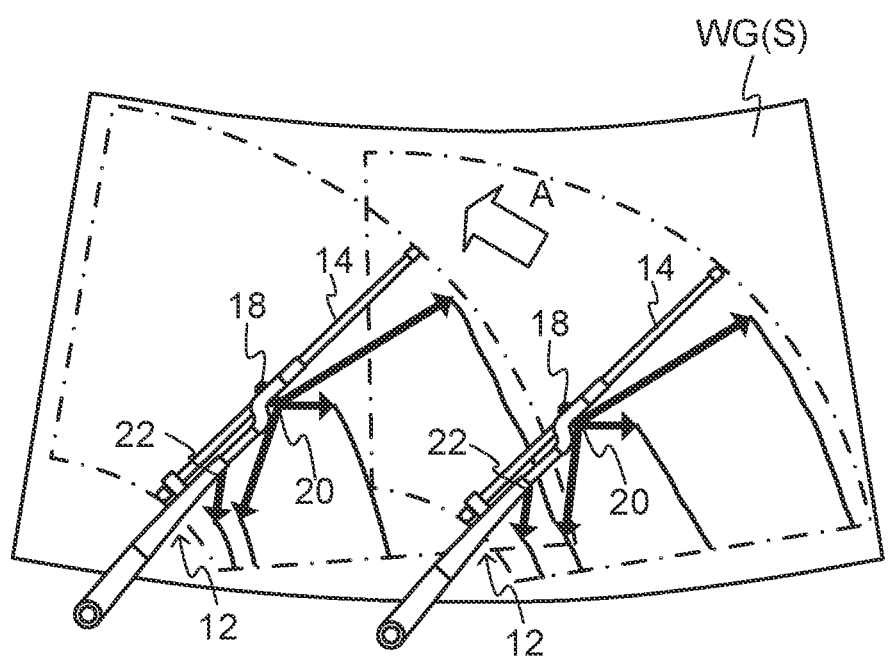
FIG. 9 is a diagram illustrating spray trajectories of washer fluid sprayed without being made to meander.

The above exemplary embodiment is configured such that washer fluid is sprayed in directions intersecting the swing directions of the wiper arms 12, and meandering spray trajectories of washer fluid are formed by varying the spray pressure of the washer pumps; however, configuration is not limited thereto. For example, spray angles of the nozzles that spray the washer fluid may be varied by driving various actuators or the like serving as meander-forming sections, with meandering spray trajectories being formed by driving the actuators so as to vary the spray angles of the washer nozzles in accordance with the swinging of the wiper arms 12. Alternatively, as illustrated in FIG. 9, a configuration may be applied in which washer fluid is sprayed at a constant spraying pressure without forming meandering spray trajectories.

Figure 13A:
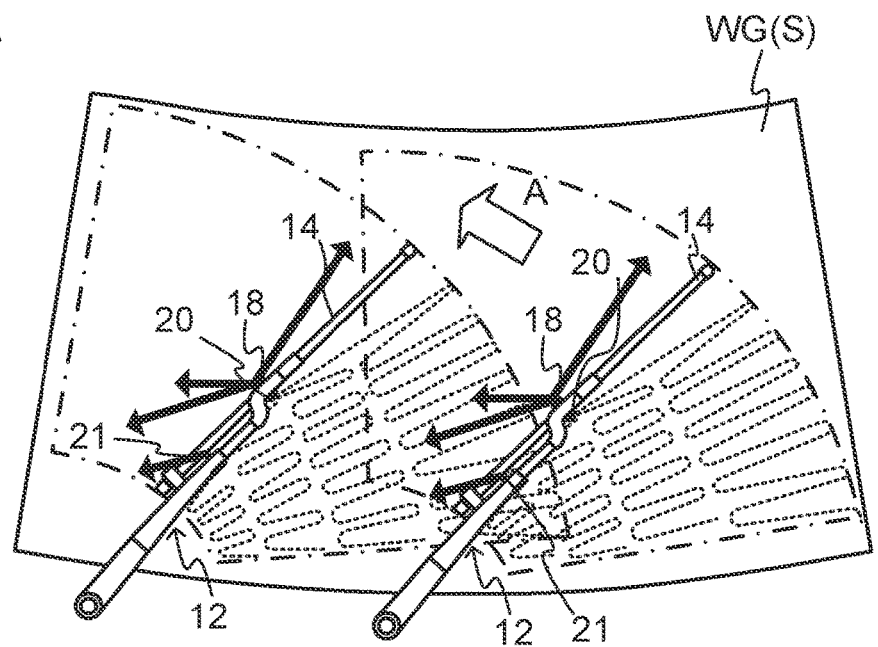
FIG. 13A is a diagram illustrating meandering spray trajectories of washer fluid.
Figure 13B:
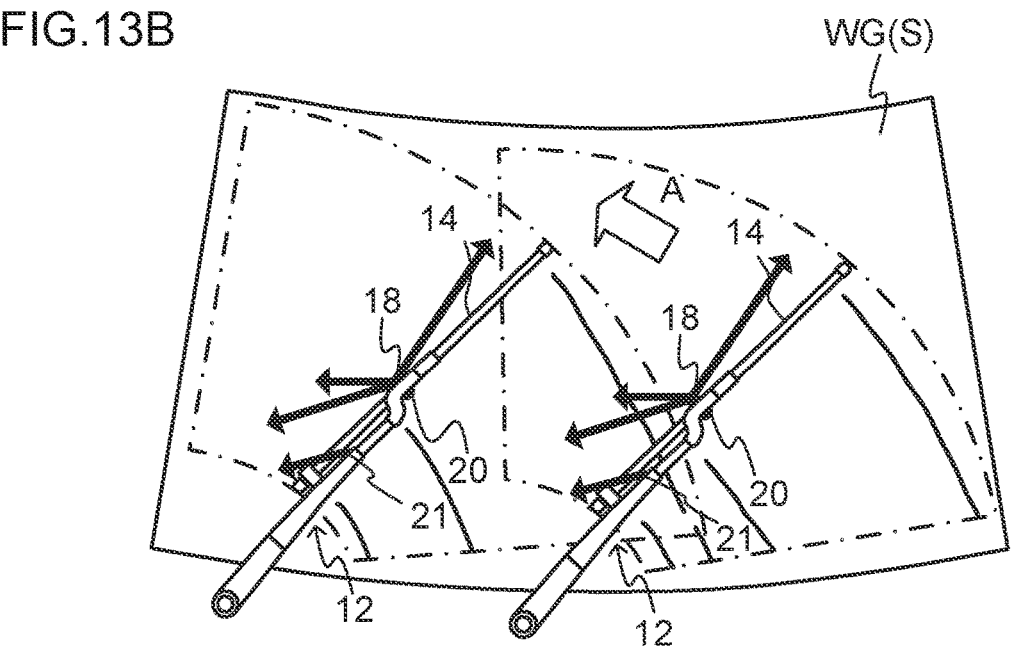
FIG. 13B is a diagram illustrating spray trajectories of washer fluid sprayed without being made to meander.

In the above exemplary embodiment, an example has been given in which meandering spray trajectories of washer fluid are formed during the view-obstructing material removal operation; however, the operation to form meandering spray trajectories is not limited to the view-obstructing material removal operation. For example, as illustrated in FIG. 13A, the spray pressure of washer fluid may be varied and meandering spray trajectories formed when the washer switch 36 is operated in order to perform a wiping operation by the wiper blades 14 and spraying of washer fluid in the movement direction of the wiper blades 14. Specifically, the voltages illustrated in FIG. 14C are applied to the first washer pump 34 during the outward wiping operation of the wiper blades 14 illustrated in FIG. 14A, and the voltages illustrated in FIG. 14B are applied to the second washer pump 35 during the return wiping operation of the wiper blades 14. In cases in which meandering spray trajectories of washer fluid are not formed, the spray trajectories form track-like trajectories in stripes (lines), as illustrated in FIG. 13B. However, varying the spray pressure so as to form meanders enables washer fluid to be distributed evenly over the wiping surface.

Figure 10:
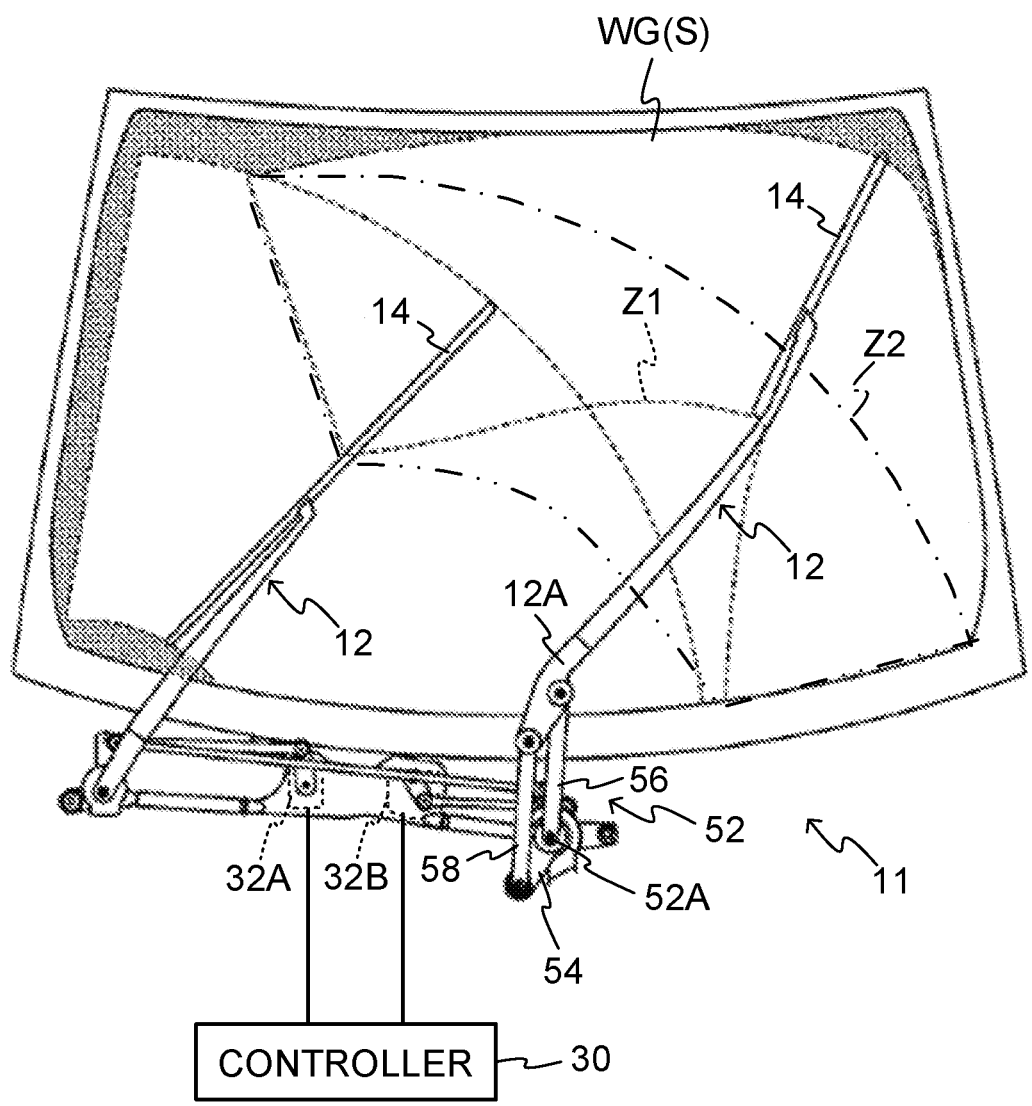
FIG. 10 is a diagram illustrating a configuration of vehicle wiper device in which a wiping range by wiper blades can be changed.

The above exemplary embodiment may further include a configuration capable of changing a wiping range of the windshield glass WG by the wiper blades 14. For example, the configuration of a vehicle wiper device 11 illustrated in FIG. 10 may be applied. FIG. 10 is a diagram illustrating configuration of the vehicle wiper device 11 in which the wiping range of the wiper blades 14 can be changed. Note that in the following explanation, the same reference numerals are applied to configurations equivalent to those of the above exemplary embodiment. The first main nozzles 18, second main nozzles 20, first sub nozzles 21, and second sub nozzles 22 are omitted from illustration in FIG. 10. FIG. 10 illustrates a case of a right-hand drive vehicle, and so the right side of the vehicle (the left side in FIG. 10) is the driver's seat side, and the left side of the vehicle (the right side in FIG. 10) is the front passenger seat side. In cases in which the vehicle is a left-hand drive vehicle, the left side of the vehicle (the right side in FIG. 10) is the driver's seat side, and the right side of the vehicle (the left side in FIG. 10) is the front passenger seat side. In cases in which the vehicle is a left-hand drive vehicle, configuration of the vehicle wiper device 11 is reversed in the left-right direction. A brief explanation follows regarding configuration of the vehicle wiper device 11 in which the wiping range can be changed.

The vehicle wiper device 11 in the example in FIG. 10 is configured including a pair of wiper arms 12, wiper blades 14 coupled to the leading ends of the wiper arms 12, a first wiper motor 32A, a second wiper motor 32B serving as a range-changing section, and a controller 30.

An output shaft of the first wiper motor 32A is rotated forward and rotated in reverse over a specific rotation angle range to operate the pair of wiper arms 12 to-and-fro over the windshield glass WG When the first wiper motor 32A is rotated forward, for example, the wiper blades 14 coupled to the leading ends of the wiper arms 12 operate so as to wipe from the lower return position to the upper return position. When the first wiper motor 32A is rotated in reverse, the wiper blades 14 coupled to the leading ends of the wiper arms 12 operate so as to wipe from the upper return position to the lower return position.

The second wiper motor 32B is a drive source that makes the wiper arm 12 on the front passenger seat side appear to extend and contract. Driving the second wiper motor 32B enables the wiping range of the windshield glass WG by the wiper blade 14 on the front passenger seat side to be changed between wiping ranges Z1 and Z2, for example.

For example, a substantially parallelogram shaped link mechanism 52 is provided to the wiper arm 12 on the front passenger seat side as a specific mechanism for changing the wiping range. The substantially parallelogram shaped link mechanism 52 is configured by a first drive lever 54, a second drive lever 56, a following lever 58, and an arm head 12A.

Figure 11:
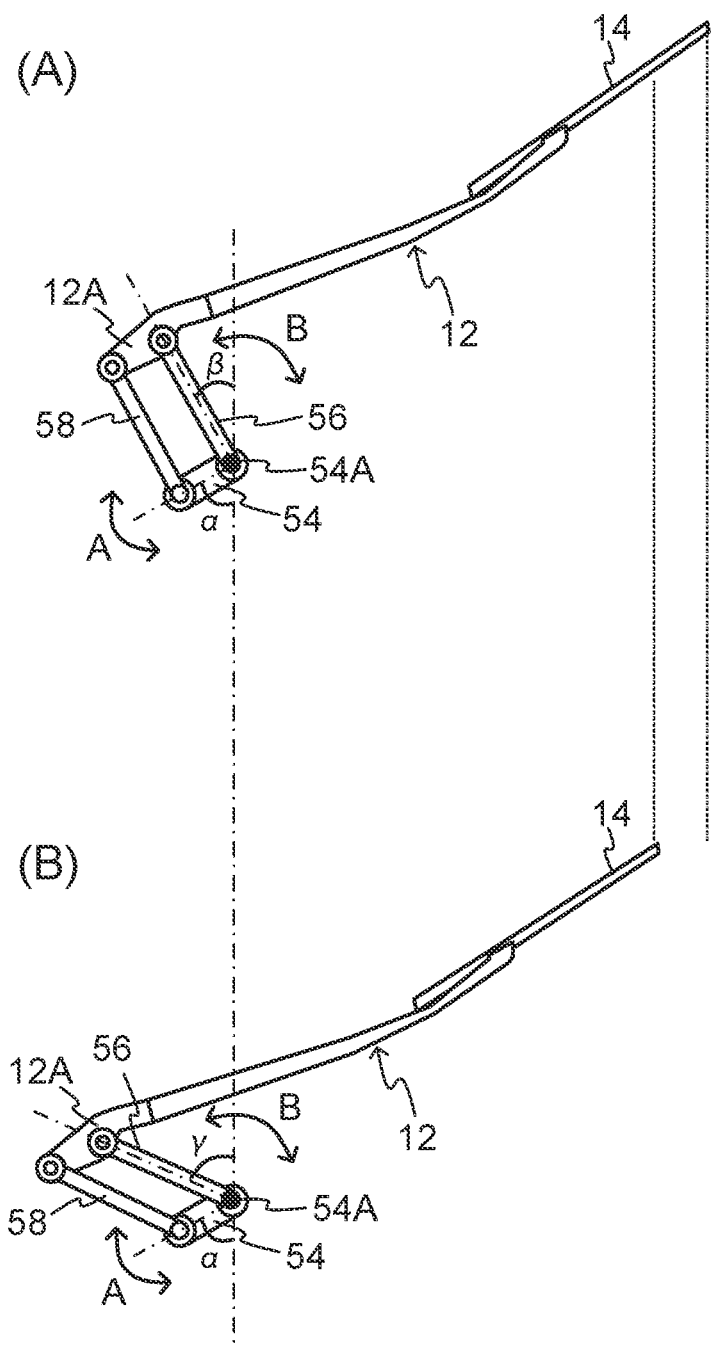
FIG. 11A is a diagram illustrating a wiper arm giving the appearance of being extended.
FIG. 11B is a diagram illustrating a wiper arm giving the appearance of being contracted.

The first drive lever 54 pivots in the arrow A directions in FIGS. 11A and 11B about the axis of a rotation shaft 54A provided at one end side of the first drive lever 54, in coordination with rotation of the first wiper motor 32A. Another end side of the first drive lever 54 is pivotally connected to one end side of the following lever 58. Another end side of the following lever 58 is pivotally connected to a vehicle lower end side of the arm head 12A.

The second drive lever 56 pivots in the arrow B directions in FIGS. 11A and 11B about an axis of the rotation shaft 54A provided at one end side of the second drive lever 56, in coordination with rotation of the second wiper motor 32B. Another end side of the second drive lever 56 is pivotally connected to a vehicle upper end side of the arm head 12A.

Figure 12A:
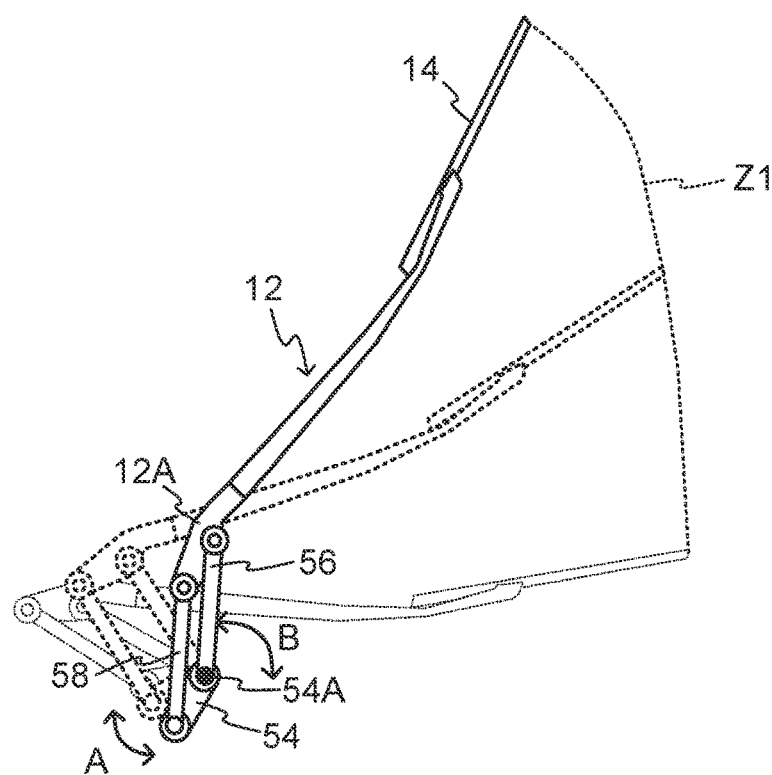
FIG. 12A is a diagram illustrating an operation of a link mechanism when wiping a wiping range Z1.
Figure 12B:
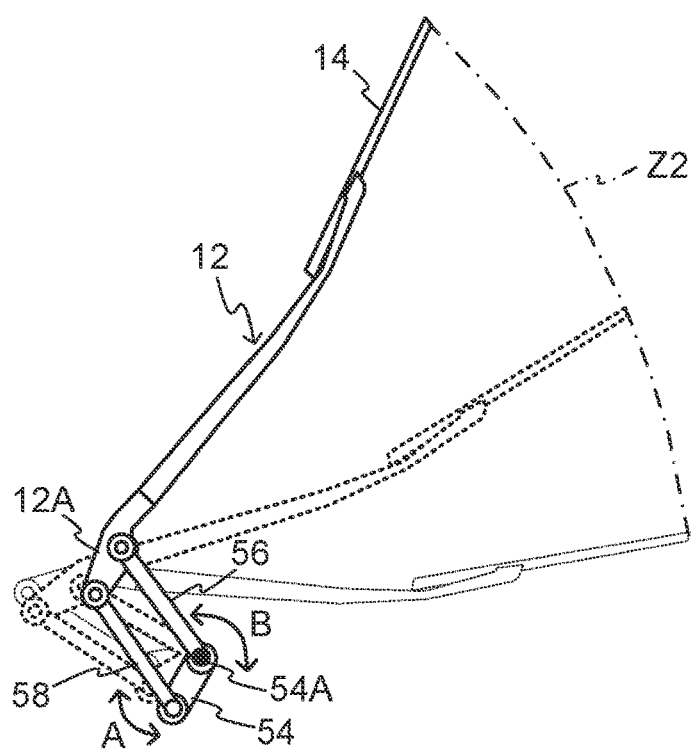
FIG. 12B is a diagram illustrating an operation of a link mechanism when wiping a wiping range Z2.

Namely, rotation of the first wiper motor 32A causes the link mechanism 52 to pivot the wiper arm 12 to-and-fro about a connecting portion between the second drive lever 56 and the arm head 12A. Driving the second wiper motor 32B causes the second drive lever 56 to pivot such that the center of rotation of the to-and-fro pivoting of the wiper arm 12 (the connecting portion between the second drive lever 56 and the arm head 12A) moves, making the wiper arm 12 appear to extend or contract. For example, FIG. 11A illustrates a state in which a rotation angle of the first drive lever 54 is an angle α and a rotation angle of the second drive lever 56 is a rotation angle β. FIG. 11B illustrates a state in which a rotation angle of the first drive lever 54 is the angle α and a rotation angle of the second drive lever 56 is a rotation angle γ. As illustrated by the dotted lines in FIGS. 11A and 11B, the pivoting of the second drive lever 56 makes the wiper arm 12 appear to extend or contract. As illustrated in FIGS. 12A and 12B, changing the rotation angle of the second wiper motor 32B (the position of the second drive lever 56) in accordance with the rotation angle of the first wiper motor 32A (the position of the first drive lever 54) enables the wiping range of the windshield glass WG by the wiper blade 14 on the front passenger seat side to be changed (in FIG. 10, the wiping range is changed between the wiping ranges Z1 and Z2). Note that configuration is such that rotation of the first wiper motor 32A (first drive lever 54) and rotation of the second wiper motor 32B (second drive lever 56) are performed independently of each other, and the pivoting of the first drive lever 54 and the pivoting of the second drive lever 56 do not affect each other. To explain in detail, the one end of the first drive lever 54 is fixed to a first rotation shaft (not illustrated in the drawings) that is rotated by rotation of the first wiper motor 32A, and the other end of the second drive lever 56 is fixed to a second rotation shaft (not illustrated in the drawings) that is rotated by rotation of the second wiper motor 32B. Note that the first rotation shaft and the second rotation shaft are coaxial to each other, and configuration is such that the rotation of the first rotation shaft and the rotation of the second rotation shaft do not affect each other. Specifically, the second rotation shaft is disposed inside a hollow first pivot shaft through a shaft bearing, such that a leading end and a base end of the second rotation shaft project out from the first pivot shaft.

Note that in the above exemplary embodiment, a configuration is described in which washer fluid is sprayed toward the outward swing direction side and the return swing direction side of the wiper arms 12 using two washer pumps (the first washer pump 34 and the second washer pump 35); however, there is no limitation thereto. For example, a configuration may be applied enabling washer fluid to be sprayed toward both the outward swing direction side and the return swing direction side of the wiper arms 12 using a mechanism in which the path of washer fluid is switched by switching the rotation direction of a single washer pump.

In the above exemplary embodiment, a configuration is applied in which the first main nozzles 18, the second main nozzles 20, the first sub nozzles 21, and the second sub nozzles 22 are provided to the respective wiper arms 12; however, there is no limitation thereto. For example, a configuration may be applied in which any or all of the nozzles are provided to the wiper blades 14, or a configuration may be applied in which nozzles are provided to both the wiper arms 12 and the wiper blades 14.

In the above exemplary embodiment, explanation has been given regarding an example in which a wiper device is configured such that the wiper blades 14 are moved to the stowed position further toward the vehicle lower side than the lower return position. However, a wiper device may be applied with a configuration in which the stowed position is the same position as the lower return position.

In the above exemplary embodiment, the first main nozzles 18 and the second main nozzles 20 each include three spray holes; however, configuration is not limited thereto. For example, these nozzles may each include two, or four or more, spray holes.

The above exemplary embodiment includes the first sub nozzles 21 and the second sub nozzles 22; however, there is no limitation thereto, and a configuration that does not include the first sub nozzles 21 and the second sub nozzles 22 may be applied.

In the above exemplary embodiment, the wiping range of the windshield glass WG by the wiper blade 14 on the front passenger seat side can be changed between the wiping ranges Z1, Z2 by driving the second wiper motor 32B; however, the wiping ranges are not limited thereto. For example, the second wiper motor 32B may be controlled to adopt a wiping range between the wiping range Z1 and the wiping range Z2.

Explanation has been given above regarding one exemplary embodiment; however, the present disclosure is not limited to the above configuration, and obviously various other modifications may be implemented within a range not departing from the spirit of the present disclosure.

The disclosures of Japanese Patent Application Nos. 2016-095501 and 2016-095502 are incorporated in their entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A vehicle wiper device comprising:
a wiper motor that causes a wiping operation to be performed on a wiping surface using a wiper blade coupled to a leading end of a wiper arm;
a washer pump that conveys washer fluid under pressure to a spray portion provided to at least one out of the wiper blade or the wiper arm so as to cause the washer fluid to be sprayed from the spray portion toward the wiping surface;
a direction controller that controls a direction in which the spray portion sprays the washer fluid; and
a control unit that, in cases in which a predetermined signal has been detected, controls the wiper motor, the washer pump, and the direction controller such that a first operation is executed to perform the wiping operation while spraying washer fluid toward an opposite direction side of the wiper blade to a movement direction side of the wiper blade performing the wiping operation.

2. The vehicle wiper device of claim 1, wherein:
after the first operation, the control unit controls the wiper motor, the washer pump, and the direction controller such that a second operation is executed to perform the wiping operation without spraying washer fluid, or to perform the wiping operation while spraying washer fluid toward the movement direction side.

3. The vehicle wiper device of claim 1, further comprising a meander-forming section that causes the washer fluid to form a meandering spray trajectory when washer fluid is being sprayed from the spray portion.

4. The vehicle wiper device of claim 3, wherein:
the spray portion is capable of spraying the washer fluid in a direction on the movement direction side that intersects the movement direction of the wiper blade, and in a direction on the opposite direction side that intersects the opposite direction to the movement direction of the wiper blade; and
the meander-forming section controls the washer pump so as to vary a spray pressure of the washer fluid when the washer fluid is being sprayed from the spray portion.

5. The vehicle wiper device of claim 3, wherein:
the spray portion is capable of changing an angle at which the washer fluid is sprayed on both the movement direction side and the opposite direction side; and
the meander-forming section controls the spray portion so as to change the angle at which the spray portion sprays the washer fluid on the movement direction side and the opposite direction side when the washer fluid is being sprayed from the spray portion.

6. The vehicle wiper device of claim 1, wherein:
as the first operation, the control unit controls the wiper motor, the washer pump, and the direction controller so as to perform the wiping operation while the washer fluid is also being sprayed toward the movement direction side.

7. The vehicle wiper device of claim 1, further comprising:
a range-changing section that changes a wiping range of the wiper blade on the wiping surface,
wherein the control unit further controls the range-changing section so as to perform the wiping operation while the wiping range is being changed.

* * * * *